(12) United States Patent
Liou et al.

(10) Patent No.: US 11,027,534 B2
(45) Date of Patent: Jun. 8, 2021

(54) FIBER COMPOSITE MATERIAL AND MANUFACTURING METHOD THEREOF

(71) Applicant: INDUSTRIAL TECHNOLOGY RESEARCH INSTITUTE, Hsinchu (TW)

(72) Inventors: Shir-Joe Liou, Hsinchu (TW); Jih-Hsiang Yeh, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 261 days.

(21) Appl. No.: 16/162,555

(22) Filed: Oct. 17, 2018

(65) Prior Publication Data

US 2019/0111671 A1    Apr. 18, 2019

Related U.S. Application Data

(60) Provisional application No. 62/573,721, filed on Oct. 18, 2017.

(30) Foreign Application Priority Data

Aug. 21, 2018   (TW) .................. 107129125

(51) Int. Cl.
*B32B 37/12*   (2006.01)
*B32B 27/08*   (2006.01)
(Continued)

(52) U.S. Cl.
CPC .............. *B32B 37/12* (2013.01); *B29C 70/32* (2013.01); *B29D 23/00* (2013.01); *B32B 27/08* (2013.01);
(Continued)

(58) Field of Classification Search
CPC ........ B29D 23/00; B29D 27/08; B29D 27/12; B32B 5/00; B32B 27/08; B32B 27/12;
(Continued)

(56) References Cited

U.S. PATENT DOCUMENTS 5,671,142 A   9/1997 Tatarazako
9,308,705 B2   4/2016 Liou et al.
(Continued)

FOREIGN PATENT DOCUMENTS

CA   2774403   5/2011
CA   2778607   5/2011
(Continued)

OTHER PUBLICATIONS

Fereidoon, et al. "Damping Augmentation of Epoxy Using Carbon Nanotubes", International Journal of Polymeric Materials, 2011, 11-26.
(Continued)

*Primary Examiner* — Lucas A Stelling
*Assistant Examiner* — Sathavaram I Reddy
(74) *Attorney, Agent, or Firm* — Amin, Turocy & Watson LLP

(57) ABSTRACT

A fiber composite material and a manufacturing method thereof are provided. The fiber composite material includes: a fiber prepreg layer including a first resin and fibers impregnated with the first resin; and a plurality of strip-shaped composite resin layers including multi-layered carbon nanotubes and a second resin disposed on the fiber prepreg layer, wherein the plurality of the strip-shaped composite resin layers and the fiber prepreg layer together form a hollow tubular body, and a length direction of the plurality of strip-shaped composite resin layer is at an angle of from 0 degree and less than 90 degrees with respect to an extending direction of the fiber prepreg layer.

19 Claims, 7 Drawing Sheets

(51) Int. Cl.
  *B32B 27/12* (2006.01)
  *B29C 70/32* (2006.01)
  *B29D 23/00* (2006.01)
  *B29K 307/04* (2006.01)
  *B82Y 30/00* (2011.01)
  *B29K 105/16* (2006.01)

(52) U.S. Cl.
  CPC ........ *B32B 27/12* (2013.01); *B29K 2105/167* (2013.01); *B29K 2307/04* (2013.01); *B29K 2995/0091* (2013.01); *B32B 2260/021* (2013.01); *B32B 2260/046* (2013.01); *B32B 2262/106* (2013.01); *B82Y 30/00* (2013.01)

(58) Field of Classification Search
  CPC .............. B32B 37/12; B32B 2260/021; B32B 2260/046; B32B 2260/106; B29C 70/32; B29K 2105/167; B29K 2307/04; B29K 2995/0091; B82Y 30/00
  See application file for complete search history.

(56) References Cited

U.S. PATENT DOCUMENTS

| | | | |
|---|---|---|---|
| 2006/0267235 | A1 | 11/2006 | Ma et al. |
| 2008/0238285 | A1* | 10/2008 | Hong ............... H01J 9/025 313/309 |
| 2010/0143661 | A1 | 6/2010 | Warrick |
| 2010/0173099 | A1 | 7/2010 | Saito et al. |
| 2011/0285049 | A1 | 11/2011 | Baker et al. |
| 2013/0057008 | A1 | 3/2013 | Takemura et al. |
| 2016/0130952 | A1 | 5/2016 | Voleti et al. |
| 2016/0176176 | A1 | 6/2016 | Liou et al. |
| 2017/0167827 | A1 | 6/2017 | Christoph et al. |
| 2017/0190909 | A1* | 7/2017 | Saegusa ............ C08L 69/00 |

FOREIGN PATENT DOCUMENTS

| | | |
|---|---|---|
| CN | 1369925 | 9/2002 |
| CN | 101250770 | 8/2008 |
| CN | 101480858 | 7/2009 |
| CN | 101772553 | 7/2010 |
| CN | 103847206 | 6/2014 |
| CN | 103855101 | 6/2014 |
| CN | 104527173 | 4/2015 |
| CN | 104558659 | 4/2015 |
| CN | 105813833 | 7/2016 |
| DE | 102010022469 | 12/2011 |
| JP | 58-053769 | 3/1983 |
| JP | 60-237896 | 11/1985 |
| JP | 2007-095471 | 4/2007 |
| JP | 2008-081695 | 4/2008 |
| JP | 2009-013327 | 1/2009 |
| JP | 2010-147526 | 7/2010 |
| JP | 2011-162898 | 8/2011 |
| JP | 2016-074903 | 5/2016 |
| TW | 200946302 | 11/2009 |
| TW | 201018084 | 5/2010 |
| TW | 201033012 | 9/2010 |
| TW | 201231286 | 8/2012 |
| TW | I509119 | 11/2015 |
| TW | M526495 | 8/2016 |
| TW | 201722708 | 7/2017 |
| WO | 2011/108677 | 9/2011 |

OTHER PUBLICATIONS

Zhou, et al. "Interfacial damping characteristics of carbon nanotube-based composites", Composites Science and Technology, vol. 64, Issue 15, Nov. 2004, pp. 2425-2437.

Suhr, et al. "Viscoelasticity in carbon nanotube composites", Nature Materials vol. 4, pp. 134-137 (2005).

Ghavanloo, et al. "Vibration and instability analysis of carbon nanotubes conveying fluid and resting on a linear viscoelastic Winkler foundation", Physica E42(2010)2218-2224.

Gou, et al. "Development and characterization of carbon nanopaper-based", Proc. of SPIE vol. 6170 61701O-1.

Kim, et al. "Edge-functionalized graphene-like platelets as a co-curing agent and a nanoscale additive to epoxy resin", J. Mater. Chem., 2011, 21, 7337.

Chinese Office Action for Chinese Patent Application No. 201711448647.0 dated Apr. 26, 2020.

Taiwanese Decision to Grant a Patent for Taiwanese Patent Application No. 106145989 dated Feb. 15, 2019.

Taiwanese Decision to Grant a Patent for Taiwanese Patent Application No. 107129125 dated Feb. 15, 2019.

Chinese Office Action for Chinese Patent Application No. 201811098927.8 dated Aug. 5, 2020.

* cited by examiner

FIBER COMPOSITE MATERIAL AND MANUFACTURING METHOD THEREOF

CROSS REFERENCE TO RELATED APPLICATION

This application claims the priority benefit of U.S. Provisional Application Ser. No. 62/573,721, filed on Oct. 18, 2017, and Taiwan Application serial no. 107129125, filed on Aug. 21, 2018. The entirety of the above-mentioned patent application is hereby incorporated by reference herein.

TECHNICAL FIELD

The present disclosure relates to a fiber composite material having vibration damping properties and a method for manufacturing the same.

BACKGROUND

Since the products related to polymer fiber composite materials meet the requirements of lightweight, high strength and high design freedom, the development trend in combination with various functional properties and uses in various lightweight structural articles is inevitable. The composite products are developed to be lighter, thinner and shorter, and the structural design is focused on high strength. Nevertheless, with the physical strength of the materials become higher, its brittleness often increases accordingly. As such, when the material is stressed, its brittleness often increases and the material breaks. To solve this problem, the damping properties of the material should be improved to increase the vibration damping effect after it absorbs force.

The transport robot arm generates displacement, deformation and vibration at high speed (2.8 msec) and rotation (210°/sec). If the duration of the mechanical arm made of the polymer fiber composite material is too long from the amplitude swing of deformation owing to movement to the stop, it needs to wait for a longer time until the swing is stationary or the amplitude is reduced to an acceptable level before proceeding to the next action. This inevitably affects the productivity. Therefore, the vibration decay time should be shortened to avoid the reduction of production capacity.

The literature has pointed out that the fiber composite material has the effect of vibration damping, but the problems to insufficient vibration reduction ratio and greatly reduced rigidity and strength of the overall material are to be solved.

SUMMARY

The present disclosure provides a fiber composite material including: a fiber prepreg layer including a first resin and fibers impregnated in the first resin; and a plurality of strip-shaped composite resin layers disposed on the fiber prepreg layer, the plurality of the strip-shaped composite resin layers and the fiber prepreg layer together form a hollow tubular body having a lamination of multi-layer fiber prepreg layers to make the plurality of the strip-shaped composite resin layers interposed between the multi-layer fiber prepreg layers, wherein the plurality of the strip-shaped composite resin layers include multi-layered carbon nanotubes and a second resin, and a length direction of the plurality of the strip-shaped composite resin layers is at an angle of from 0 degree to less than 90 degrees with respect to an extending direction of the fiber prepreg layer.

The present disclosure provides a method for manufacturing a fiber composite material, including: attaching a plurality of strip-shaped composite resin layers on a fiber prepreg layer including a first resin and fibers impregnated in the first resin, wherein the plurality of the strip-shaped composite resin layers include multi-layered carbon nanotubes and a second resin, and a length direction of the plurality of the strip-shaped composite resin layers is at an angle of from 0 degree to less than 90 degrees with respect to an extending direction of the fiber prepreg layer; winding the fiber prepreg layer and the plurality of the strip-shaped composite resin layers to form a hollow tubular body having a lamination of multi-layer fiber prepreg layers; and shaping the hollow tubular body.

BRIEF DESCRIPTION OF THE DRAWINGS

FIGS. 2A and 2B are cross-sectional views of the wound fiber composite material of Example 1 in a direction perpendicular to an axial direction thereof, wherein FIG. 2A is a cross-sectional view of the composite resin layer without cutting on the strip-shaped composite resin layers, and FIG. 2B is a cross-sectional view with cutting on the strip-shaped composite resin layers.

DETAILED DESCRIPTION OF THE EMBODIMENTS

Figure 1:
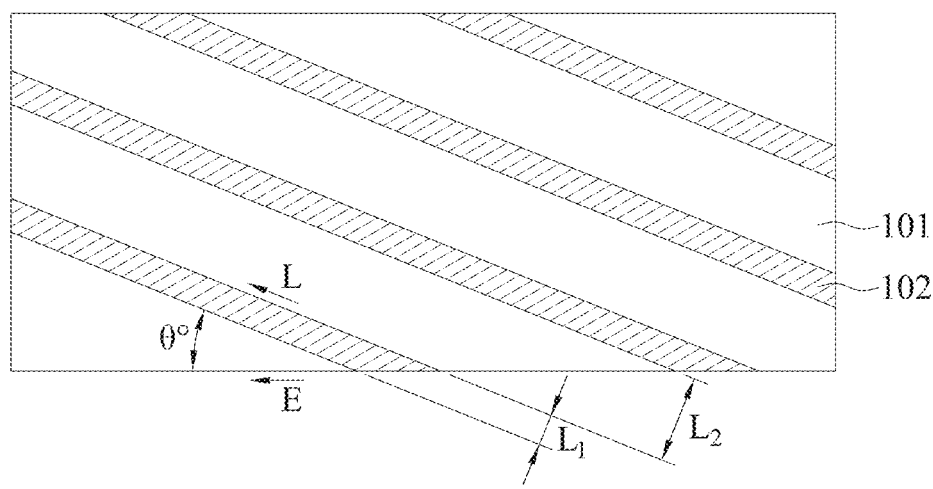
FIG. 1 is a schematic view showing a width ratio of a plurality of strip-shaped composite resin layers to a fiber prepreg layer in the plane and an angle of an extending direction (θ°).

In the following detailed description, for purposes of explanation, numerous specific details are set forth in order to provide a thorough understanding of the disclosed embodiments. It will be apparent, however, that one or more embodiments may be practiced without these specific details.

It should be noted that the structures, proportions, dimensions, and the like, which are illustrated in the drawings, are merely for the purposes of the disclosure of the present specification, rather than limiting the present disclosure to certain conditions. As such, one skilled in the art can understand and read. Accordingly, there is no technically substantial significance. Modification of any structure, change in proportional relationship, or adjustment of size shall be included in the scope of the present specification without affecting the effects and possible accomplishments of the present specification. In the absence of substantial changes to the technical content, changes or adjustments in their relative relationship are considered to be within the scope of the present disclosure.

The fiber composite material of the present disclosure is found that, when a plurality of composite resin layers are disposed on the fiber prepreg layers at intervals, and a length direction of the plurality of the composite resin layers is at an angle of from 0 degree to less than 90 degrees with respect to and an extending direction of the fiber prepreg layer, an effect of vibration damping can be greatly improved while maintaining the hardness property of the material at the same time.

With reference to FIG. 1, the present disclosure provides a method for manufacturing a fiber composite material including: attaching a plurality of strip-shaped composite resin layers 102 to a fiber prepreg layer 101 including a first resin and fibers impregnated in the first resin, wherein the plurality of the strip-shaped composite resin layers 102 include multi-layered carbon nanotubes and a second resin, and a length direction L of the plurality of the composite resin layers 102 is at an angle of from 0 degree to less than 90 degrees with respect to an extending direction E of the fiber prepreg layer 101; winding the fiber prepreg layers and the plurality of the strip-shaped composite resin layer to form a hollow tubular body having a lamination of multi-layer fiber prepreg layers 101; and shaping the hollow tubular body.

In one embodiment, a ratio of the width $L_1$ of the strip-shaped composite resin layer to an interval $L_2$ of the plurality of the strip-shaped composite resin layer is 1:1 to 1:10. In another embodiment, a ratio between the width $L_1$ of the strip-shaped composite resin layer and an interval $L_2$ of the plurality of the strip-shaped composite resin layer is 1:3 to 1:5.

In one embodiment, a length direction of the plurality of the strip-shaped composite resin layers is at an angle of from 20 to 80 degrees with respect to an extending direction of the fiber prepreg layer. Moreover, the arrangement of the strip-shaped composite resin is not limited to the parallel arrangement, and the strip-shaped composite resins are not laminated one another.

In general, the preparation method of the fiber prepreg layer includes manual lamination, spray coating, lamination, continuous lamination, resin transfer molding, winding molding, sheet molding (SMC), block molding (BMC), prepreg molding, autoclave molding, etc.

In one embodiment, examples of the fibers include a carbon fiber, glass fiber, aromatic polyamine (Kevlar) fiber, boron fiber, nylon fiber, Tedron fiber, cotton fiber, wool fiber, steel fiber, aluminum fiber or ceramic whisker fiber, and may be selected from at least one of the fibers. In the disclosure, the fibers of the fiber prepreg layer are impregnated in a first resin, and the composite resin layer is mixed with multi-layered carbon nanotubes and a second resin, wherein the first resin and the second resin are the same or different, and a thermoplastic resin or a thermosetting resin can be included. Examples of the thermoplastic resin include polycarbonate (PC), nylon (Nylon), polypropylene (PP), polyphenylene sulfide (PPS) or polyetheretherketone (PEEK); and thermosetting resin can be, for example, an epoxy resin.

In one embodiment, said fiber prepreg layer may have a thickness of 50 µm to 200 µm; said strip-shaped composite resin layer may have a thickness of 5 µm to 200 µm, where the thickness may be adjust according to the rigidity strength requirements of the prepared components.

It is believed that, when an external force causes the relative displacement (sliding) between the resin and a wall of the multi-layered carbon nanotubes, the displacement difference and the integral of shear force between the interfaces are equal to the generated energy loss. That is why the vibration is reduced.

In one embodiment, the multi-layered carbon nanotubes provide more micro-slip phenomenon than the single-layer carbon nanotubes by the multi-layered tube wall, and the accumulated damping properties can be rapidly amplified so as to suppress the vibration more effectively.

On the other hand, after modification, the carbon nanotubes have a reactive functional group, and the reactive functional group may be an amine group, a carboxyl group, a hydroxyl group or an acyl chloride group, but is not limited thereto. The method of the modification can be referred to the method disclosed in J. Mater. Chem., 2011, 21, 7337-7342.

Furthermore, in one embodiment, the multi-layered carbon nanotubes have a specific surface area of 100 to 300 $m^2/g$, and the specific surface area range allows the carbon nanotubes to be mixed well with a second resin. An amount of the carbon nanotubes in the plurality of the strip-shaped composite resin layers is 0.5 to 8 wt %. In contrast, an amount of the second resin in the plurality of the strip-shaped composite resin layers is 92 to 99.5 wt %.

According to the method of the present disclosure, the fiber composite material is shaped by heating, and during the heating process, the reactive functional group of the carbon nanotube is bonded to the first resin and the second resin to harden and shape.

In general, the method of forming a fiber composite is to use a conventional laminating method, that is, to laminate different materials with the desired number of layer each, followed by winding to shape. However, this method can just manufacture one fiber composite material at a time, and it is uneconomical for the mass manufacture in the industry.

Therefore, in another embodiment, the fiber composite material of the present disclosure is prepared by attaching a plurality of strip-shaped composite resin layers on a fiber prepreg layer. Base on needs, a ratio of width of the strip-shaped composite resin layers to an interval of the plurality of the strip-shaped composite resin layers is 1:1 to 1:10, and a length direction of the plurality of the composite resin layers is at an angle of from 0 degree to less than 90 degrees with respect to an extending direction of the fiber prepreg layer. In another embodiment, the angle is between 0 and 40 degrees.

Specifically, when the composite resin layer is laminated, and a plurality of strip-shaped composite resin layers are substantially laid at intervals along the extending (i.e., winding) direction E of the fiber prepreg layer. Therefore, through the method of manufacturing a fiber composite material disclosed in the present disclosure, the machine can massively manufacture the fiber composite material of the multi-layered structure more economically at one time.

In addition, according to the manufacturing method of the present disclosure, the shape of the hollow tubular body formed includes a round shape, an elliptical shape, a square shape, and a rectangular shape, but is not limited thereto.

The disclosure illustrates details by way of examples. However, the interpretation of this disclosure should not be limited to the following examples.

EXAMPLE 1

Figure 2A:
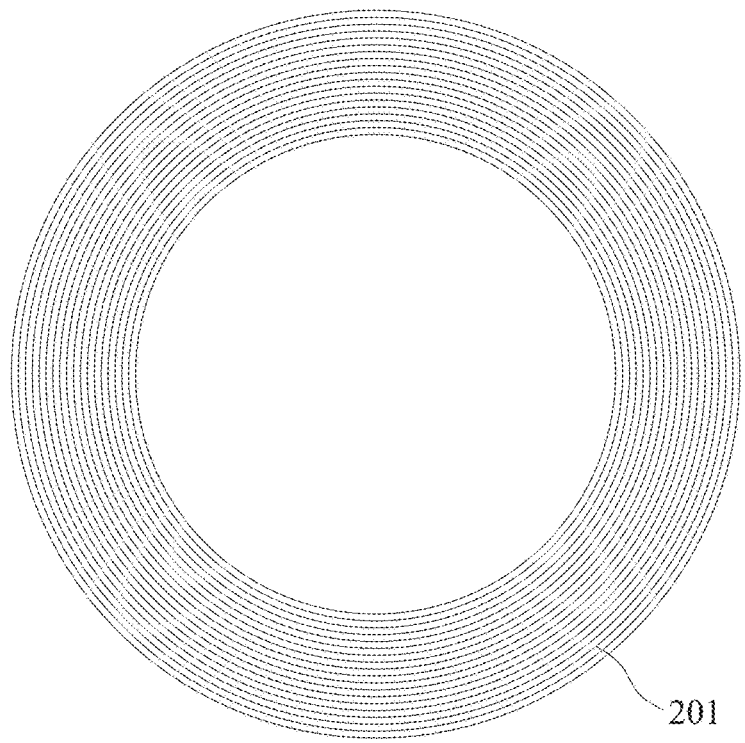
Figure 2B:
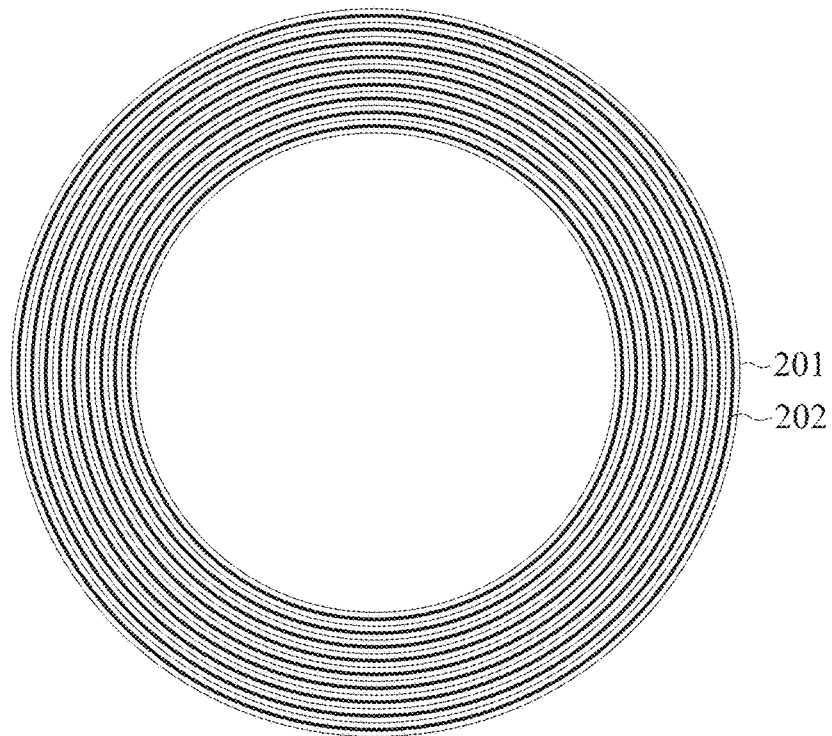
Figure 3:
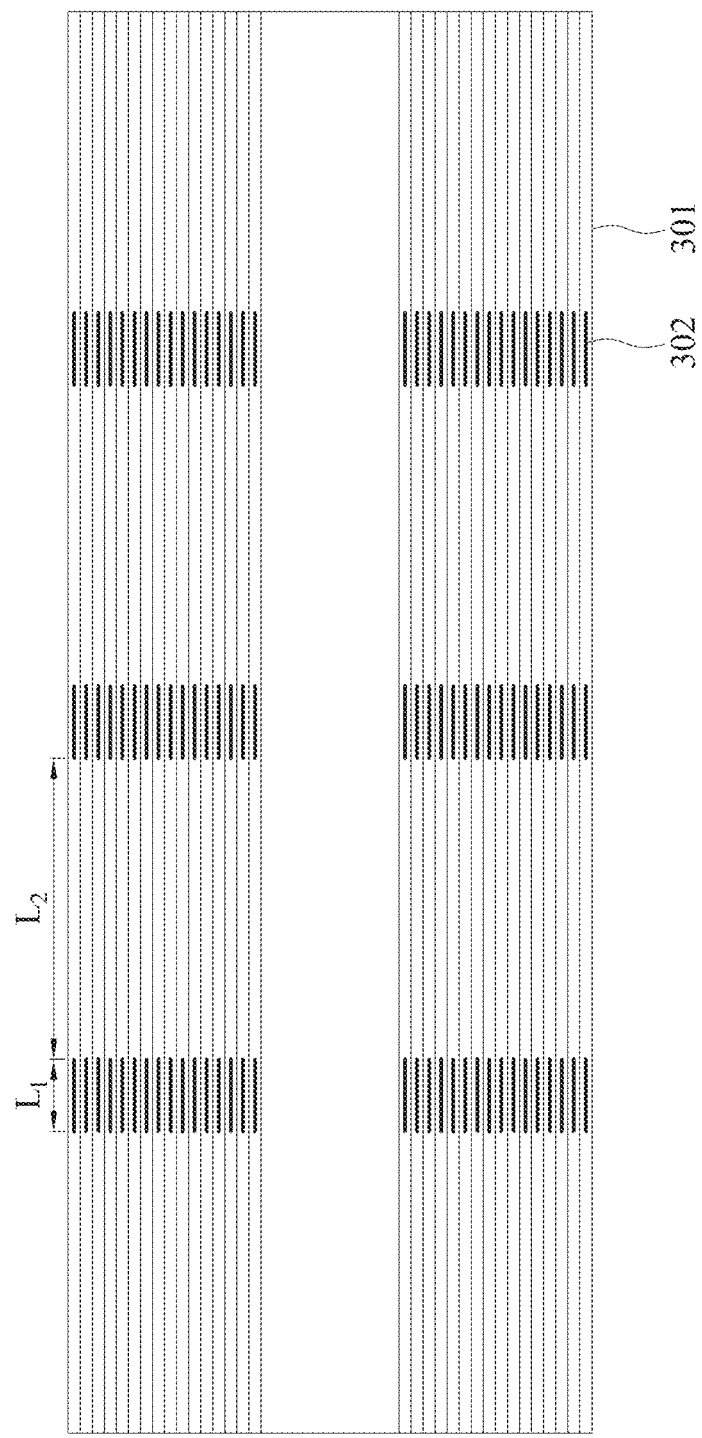
FIG. 3 is a side cross-sectional view of the wound fiber composite material of Example 1 along an axial direction thereof.

The preparation procedure and conditions of Example 1 (No.: 4V) of the present disclosure and the materials are as follows: Fiber: carbon fiber (Toray, T700SC, 12K); a first/second resin: epoxy resin (Dow Chemical, Epon 828);

multi-layered carbon nanotubes: A-MWCNT1020, Scientech (5 wt % of the composite resin layer); modified functional group: amine group (according to the method of J. Mater. Chem., 2011, 21, 7337-7342). For preparation of a tubular hollow body with a length of 450 mm×a diameter of 20 mm and a thickness of 4.0 mm, 4 strip-shaped composite resin layers (thickness of 70±2 μm) are laterally attached to a fiber prepreg layer at an angle of 0 degree (θ°) on the prepreg layer (thickness of 80±2 μm) (similarly as shown in FIG. 1, but with an angle of 0 degree). A ratio of a width $L_1$ of the strip-shaped composite resin layer to an interval $L_2$ of the plurality of the strip-shaped composite resin layers is 1:4. Then, the abovementioned laminated material is wound and wrapped on a core mold which has been put on a suitable plastic air bag, and a cross-section of the laminated structure is in two forms, as shown in FIG. 2A and FIG. 2B; wherein a plurality of strip-shaped composite resin layers 202 are disposed on fiber prepreg layers 201, and form a hollow tubular body with the fiber prepreg layers 201, such that the plurality of the composite resin layers 202 are interposed between the fiber prepreg layers 201 (a number of layer of the fiber prepreg layers after winding is 20). After completion of the above wrapping process, it is placed and fixed in a prepared aluminum metal mold; the core mold is then taken out and the plastic air bag is retained in the fiber laminate; and the whole aluminum metal mold is pressurized at 20 to 25 psi. At this time, the plastic air bag is filled with gas of 25 to 30 psi to support the hollow portion of the fiber laminate to maintain its shape and size to avoid collapse of the internal structure, and then heated at 160° C. on the aluminum metal mold; and after heating for 40 minutes, it would be hardened and formed until cooling to the room temperature. The formed fiber composite material element is taken out from the mold, followed by taking out the air bag, modifying the surface and cutting for the completion of the process. A side cross-section of the laminated structure of the formed round tubular hollow body is as shown in FIG. 3; wherein a ratio of a width $L_1$ of the strip-shaped composite resin layer 302 to an interval $L_2$ of the plurality of the strip-shaped composite resin layers 302 (i.e., a length of the fiber prepreg layer 301 between the two strip-shaped composite resin layers 302 in the axial direction) is 1:4.

EXAMPLE 2

The manufacturing method and conditions of Example 2 (No.: 2V) of the present disclosure are as described in Example 1, and a ratio of a width $L_1$ of the strip-shaped composite resin layer to an interval $L_2$ of the plurality of the strip-shaped composite resin layers is changed to 1:2.

EXAMPLE 3

The manufacturing method and conditions of Example 3 (No.: 3V) are as described in Example 1, and a ratio of a width $L_1$ of the strip-shaped composite resin layer to an interval $L_2$ of the plurality of the strip-shaped composite resin layers is changed to 1:3.

EXAMPLE 4

The manufacturing method and conditions of Example 4 (No.: 5V) are as described in Example 1, and a ratio of a width $L_1$ of the strip-shaped composite resin layer to an interval $L_2$ of the plurality of the strip-shaped composite resin layers is changed to 1:5.

EXAMPLE 5

The manufacturing method and conditions of Example 5 (No.: 6V) are as described in Example 1, and a ratio of a width $L_1$ of the strip-shaped composite resin layer to an interval $L_2$ of the plurality of the strip-shaped composite resin layers is changed to 1:6.

EXAMPLE 6

Figure 4:
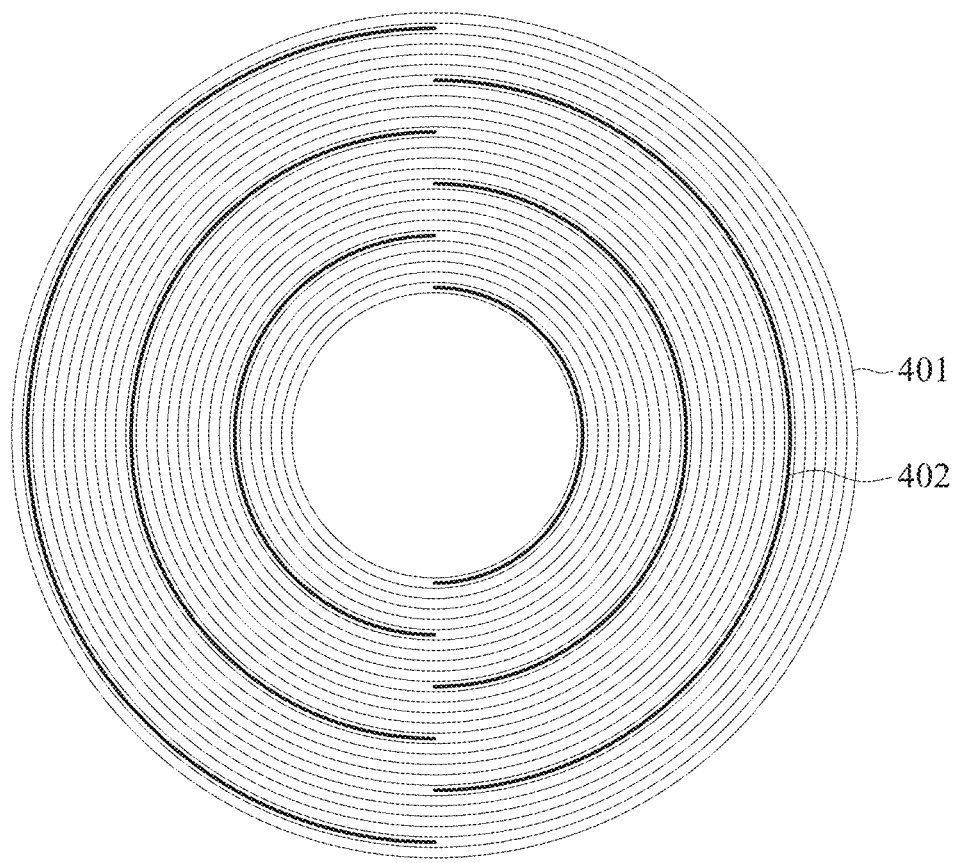
FIG. 4 is a cross-sectional view of the wound fiber composite material of Example 2 in a direction perpendicular to an axial direction thereof.
Figure 5:
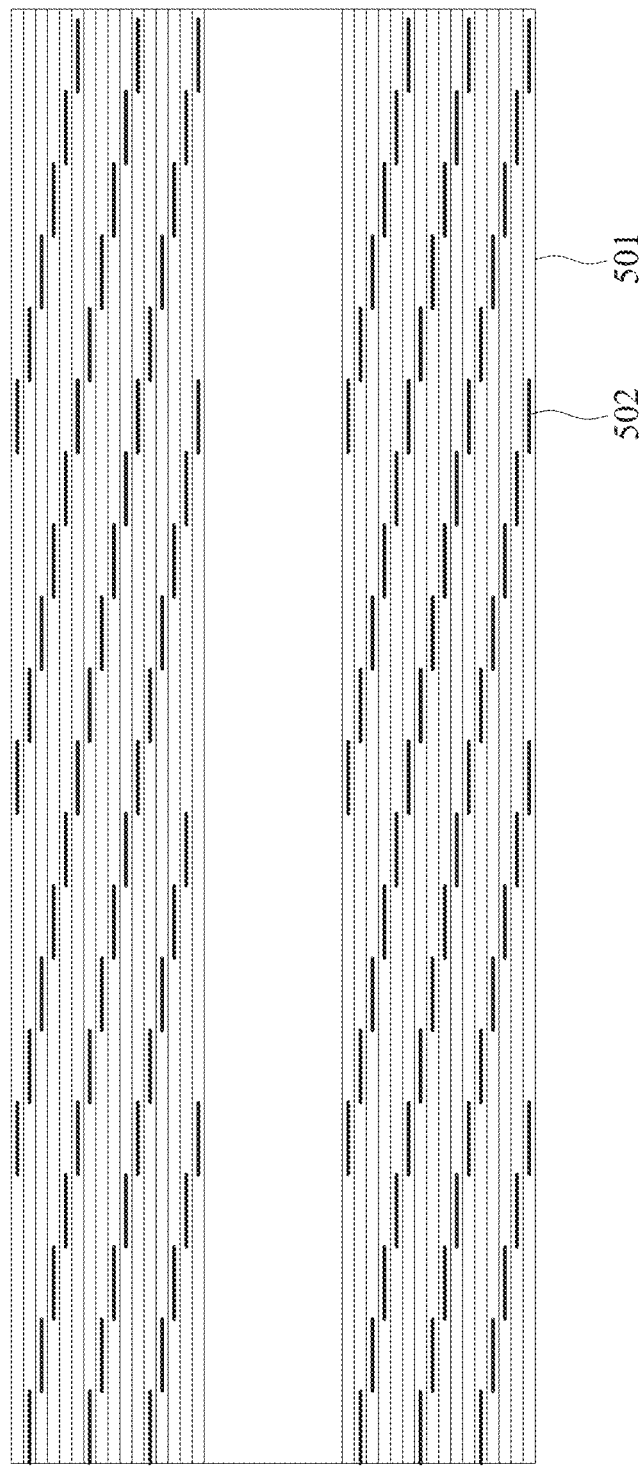
FIG. 5 is a side cross-sectional view of the wound fiber composite of Example 2 along an axial direction thereof.

The manufacturing method and conditions of Example 6 (No.: 4S) are as described in Example 1, and a length direction of the plurality of the strip-shaped composite resin layers is at an angle changed to be 30 degrees (θ°) with respect to an extending direction of the fiber prepreg layer. The cross-section of the laminated structure is as shown in FIG. 4, wherein a plurality of strip-shaped composite resin layers 402 are disposed on fiber prepreg layers 401, and form a hollow tubular body with the fiber prepreg layers 401, such that the plurality of the composite resin layers 402 are interposed between the fiber prepreg layers 401. A side cross-section of laminated structure of the formed round tubular hollow body is as shown in FIG. 5. Based on the side cross-section in the axial direction of the formed round tubular hollow body, the plurality of composite resin layers 502 are interposed between the fiber prepreg layers 501, and the plurality of the composite resin layers 502 are disposed with ladder distribution.

EXAMPLE 7

The manufacturing method and conditions of Example 7 (No.: 2S) are as described in Example 6, and a ratio of a width $L_1$ of the strip-shaped composite resin layer to an interval $L_2$ of the plurality of the strip-shaped composite resin layers is changed to 1:2.

EXAMPLE 8

The manufacturing method and conditions of Example 8 (No.: 3S) are as described in Example 6, and a ratio of a width $L_1$ of the strip-shaped composite resin layer to an interval $L_2$ of the plurality of the strip-shaped composite resin layers is changed to 1:3.

EXAMPLE 9

The manufacturing method and conditions of Example 9 (No.: 5S) are as described in Example 6, and a ratio of a width $L_1$ of the strip-shaped composite resin layer to an interval $L_2$ of the plurality of the strip-shaped composite resin layers is changed to 1:5.

EXAMPLE 10

The manufacturing method and conditions of Example 10 (No.: 6V) are as described in Example 6, and a ratio of a width $L_1$ of the strip-shaped composite resin layer to an interval $L_2$ of the plurality of the strip-shaped composite resin layers is changed to 1:6.

COMPARATIVE EXAMPLE 1

The manufacturing method and conditions of Comparative Example 1 (No.: Pure) are as described in Example 1. The strip-shaped composite resin layers are not attached on the fiber prepreg layers, and a number of layers of the fiber prepreg layers after winding is 20.

COMPARATIVE EXAMPLE 2

The manufacturing method and conditions of Comparative Example 2 (No.: 2L) are as described in Example 1, and a length direction of the plurality of the strip-shaped composite resin layers is at an angle changed to be 90 degrees (θ°) with respect to an extending direction of the fiber prepreg layer; and by changing intervals between the composite resin layers on the fiber prepreg layers, the composite resin layers after winding are disposed between the $7^{th}$ and $8^{th}$ layers of the fiber prepreg layers, and between the $13^{th}$ and $14^{th}$ layers of the fiber prepreg layers.

Figure 6:
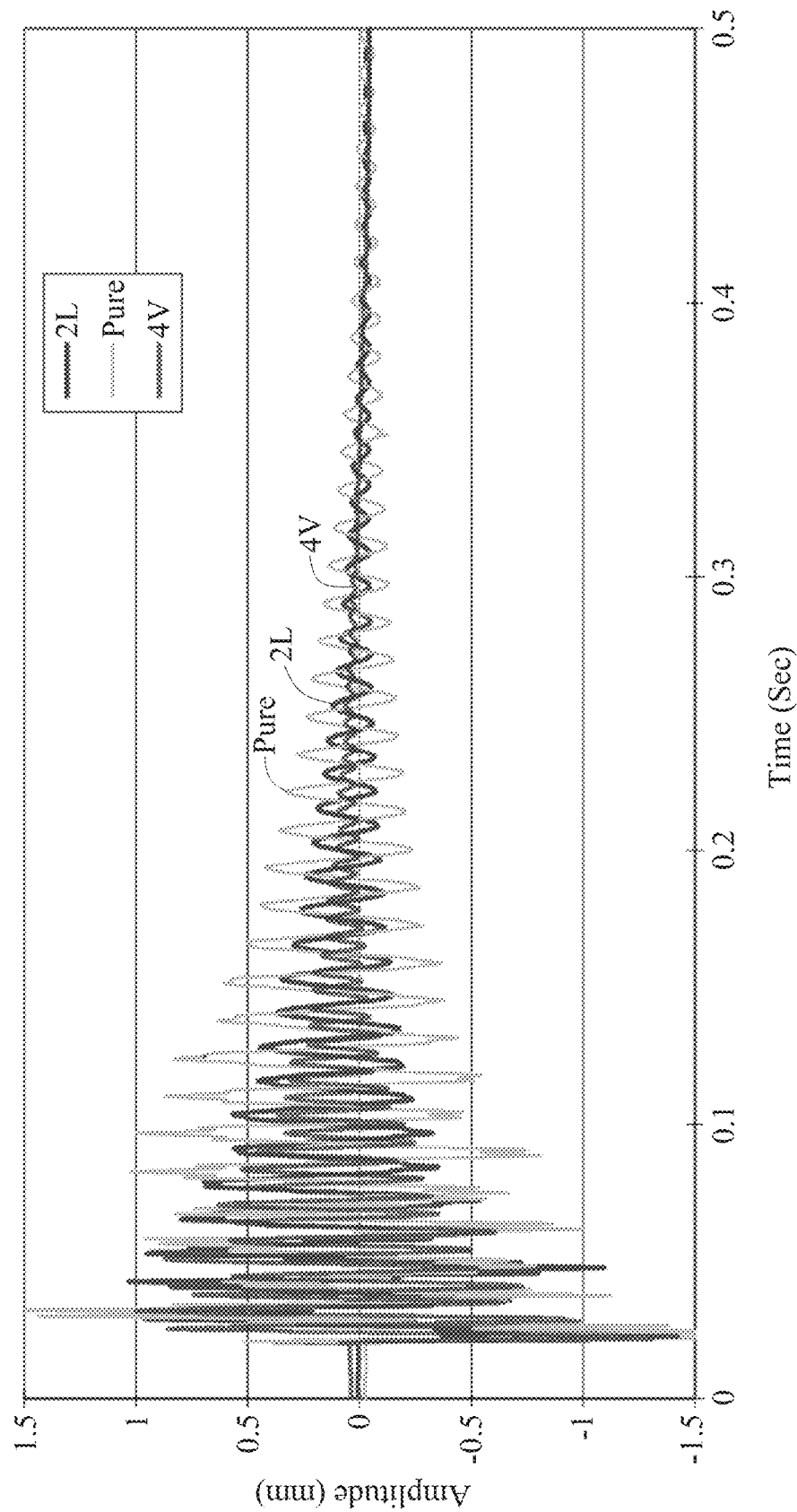
FIG. 6 is a comparison diagram of vibration decay time among Example 1 and fiber composite materials having different structures.
Figure 7:
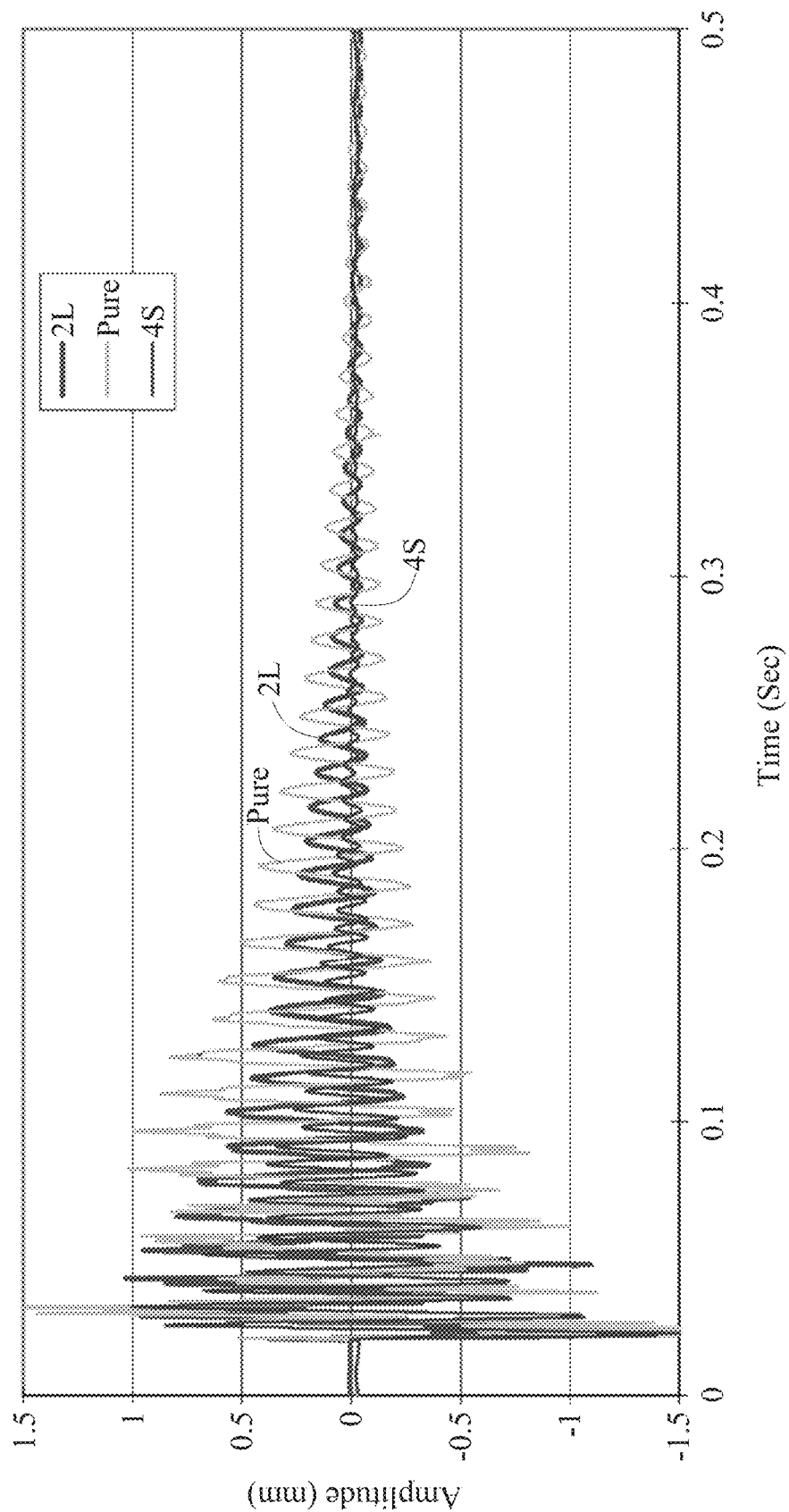
FIG. 7 is a comparison diagram of vibration decay time among Example 2 and fiber composite materials having different structures.

Based on Table 1, FIGS. 6 and 7, in comparison of Comparative Example 1 where the composite resin layers are not added on the fiber prepreg layers, and Examples 1 and 6 as well as Comparative Example 2 where an angle between the composite resin layer and the extending direction of the fiber prepreg layer are 0, 30 and 90 degrees, those with an angle of 0, 30 and 90 degrees bring about an effect of full amplitude reduction of 81.2%, 88.3%, and 53.5%, respectively. That is, adjusting the angle between the composite resin layer and the extending direction of the fiber prepreg layer can increase the effect of full amplitude reduction.

In addition, the natural frequency of Table 1 refers to the dynamic properties of a structure per se, which is proportional to the square root of the system stiffness and inversely proportional to the square root of the mass. Therefore, based on Table 1, the ratio of the width $L_1$ of the strip-shaped composite resin layer to the interval $L_2$ of the plurality of the strip-shaped composite resin layers brings about an effect of full amplitude reduction, and the above width ratio is 1:3 to 1:5. In this range, the vibration damping efficiency of the fiber composite material is improved synchronously with the rigidity. When the width ratio is 1:6 (No.: 6V and 6S), however, the vibration damping efficiency is reduced, and the rigidity of the fiber composite material is not improved either, failing to meet the application requirements of related products with the desired structural rigidity.

TABLE 1

| No. | Number of layers of wound fiber prepreg layer | With/without nanotubes | Content of nanotubes | Number of layer of composite resin layer mixed with multi-layered nanotubes and resin | Relationship of composite resin layer and fiber prepreg layer | Width ratio of strip-shaped composite resin layer (L1) to fiber prepreg layer(L2) | Angle between composite resin layer and fiber prepreg layer | Full amplitude (mm) at 0.2 sec | Compared relative full amplitude reduction % of Pure | Frequency (Hz) | Loss Factor |
|---|---|---|---|---|---|---|---|---|---|---|---|
| Pure | 20 | N/A | N/A | N/A | N/A | N/A | N/A | 0.575 | — | 140.0 | 0.0410 |
| 2L | 20 | Multi-Layered nanotubes | 5 wt % | 2 | Disposed between $7^{th}$ and $8^{th}$, $13^{th}$ and $14^{th}$ of layers of fiber prepreg layer | | 90 degree | 0.267 | 53.50 | | |
| 2V | 20 | Multi-Layered nanotubes | 5 wt % | 4 | With multiple lamination one another, or without any lamination | 1:2 | 0 degree | 0.098 | 82.80 | 128.0 | 0.0462 |
| 3V | 20 | Multi-Layered nanotubes | 5 wt % | 4 | With multiple lamination one another, or without any lamination | 1:3 | 0 degree | 0.101 | 82.30 | 142.0 | 0.0461 |
| 4V | 20 | Multi-Layered nanotubes | 5 wt % | 4 | With multiple lamination one another, or without any lamination | 1:4 | 0 degree | 0.105 | 81.20 | 156.0 | 0.0460 |
| 5V | 20 | Multi-Layered nanotubes | 5 wt % | 4 | With multiple lamination one another, or without any lamination | 1:5 | 0 degree | 0.128 | 77.60 | 145.0 | 0.0459 |
| 6V | 20 | Multi-Layered nanotubes | 5 wt % | 4 | With multiple lamination one another, or without any lamination | 1:6 | 0 degree | 0.332 | 42.20 | 141.0 | 0.0442 |
| 2S | 20 | Multi-Layered nanotubes | 5 wt % | 4 | With spiral distribution | 1:2 | 30 degree | 0.038 | 93.40 | 132.0 | 0.0493 |
| 3S | 20 | Multi-Layered nanotubes | 5 wt % | 4 | With spiral distribution | 1:3 | 30 degree | 0.065 | 88.60 | 149.0 | 0.0478 |
| 4S | 20 | Multi-Layered nanotubes | 5 wt % | 4 | With spiral distribution | 1:4 | 30 degree | 0.067 | 88.30 | 157.0 | 0.0465 |

TABLE 1-continued

| No. | Number of layers of wound fiber prepreg layer | With/without nanotubes | Content of nanotubes | Number of layer of composite resin layer mixed with multi-layered nanotubes and resin | Relationship of composite resin layer and fiber prepreg layer | Width ratio of strip-shaped composite resin layer (L1) to fiber prepreg layer(L2) | Angle between composite resin layer and fiber prepreg layer | Full amplitude (mm) at 0.2 sec | Compared relative full amplitude reduction % of Pure | Frequency (Hz) | Loss Factor |
|---|---|---|---|---|---|---|---|---|---|---|---|
| 5S | 20 | Multi-Layered nanotubes | 5 wt % | 4 | With spiral distribution | 1:5 | 30 degree | 0.122 | 78.70 | 149.0 | 0.0459 |
| 6S | 20 | Multi-Layered nanotubes | 5 wt % | 4 | With spiral distribution | 1:6 | 30 degree | 0.296 | 48.50 | 141.0 | 0.0447 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A fiber composite material, comprising:
a fiber prepreg layer comprising a first resin and fibers impregnated in the first resin; and
a plurality of strip-shaped composite resin layers disposed on the fiber prepreg layer, the plurality of the strip-shaped composite resin layers and the fiber prepreg layer together form a hollow tubular body having a lamination of multi-layer fiber prepreg layers to make the plurality of the strip-shaped composite resin layers interposed between the multi-layer fiber prepreg layers,
wherein the plurality of the strip-shaped composite resin layers comprise multi-layered carbon nanotubes and a second resin, and a length direction of the plurality of the strip-shaped composite resin layers is at an angle of from 0 degree to less than 90 degrees with respect to an extending direction of the fiber prepreg layer.

2. The fiber composite material of claim 1, wherein a ratio of width a strip-shaped composite resin layer to an interval of the plurality of the strip-shaped composite resin layers is 1:1 to 1:10.

3. The fiber composite material of claim 1, wherein the first resin and the second resin are the same, and the first resin and the second resin are thermoplastic resins or thermosetting resins.

4. The fiber composite material of claim 1, wherein the first resin and the second resin are different, and the first resin and the second resin are thermoplastic resins or thermosetting resins.

5. The fiber composite material of claim 1, wherein the multi-layered carbon nanotube has a specific surface area of 100 $m^2/g$ to 300 $m^2/g$.

6. The fiber composite material of claim 1, wherein a surface of the multi-layered carbon nanotube has reactive functional groups containing an amine group, a carboxyl group, a hydroxyl group or an acyl chloride group.

7. The fiber composite material of claim 1, wherein an amount of the multi-layered carbon nanotubes in the plurality of the strip-shaped composite resin layers is 0.5 wt % to 8 wt %.

8. The fiber composite material of claim 1, wherein the fibers comprise carbon fibers, glass fibers, aromatic polyamine (Kevlar) fibers, boron fibers, nylon fibers, Tedron fibers, cotton fibers, wool fibers, steel fibers, aluminum fibers or ceramic silk fibers.

9. The fiber composite material of claim 1, wherein the angle is from 0 degree to 40 degrees.

10. A method for manufacturing a fiber composite material, comprising:
attaching a plurality of strip-shaped composite resin layers on a fiber prepreg layer comprising a first resin and fibers impregnated in the first resin, wherein the plurality of the strip-shaped composite resin layers comprise multi-layered carbon nanotubes and a second resin, and a length direction of the plurality of the strip-shaped composite resin layers is at an angle of from 0 degree to less than 90 degrees with respect to an extending direction of the fiber prepreg layer;
winding the fiber prepreg layer and the plurality of the strip-shaped composite resin layers to form a hollow tubular body having a lamination of multi-layer fiber prepreg layers; and
shaping the hollow tubular body.

11. The method of claim 10, wherein the plurality of the strip-shaped composite resin layers are between the multi-layer fiber prepreg layers with multiple lamination one another or without any lamination, or with spiral distribution.

12. The method of claim 10, wherein a ratio of width of the strip-shaped composite resin layer to an interval of the plurality of the strip-shaped composite resin layers is 1:1 to 1:10.

13. The method of claim 10, wherein the first resin and the second resin are the same, and the first resin and the second resin are thermoplastic resins or thermosetting resins.

14. The method of claim 10, wherein the first resin and the second resin are different, and the first resin and the second resin are thermoplastic resins or thermosetting resins.

15. The method of claim 10, wherein the multi-layered carbon nanotube has a specific surface area of 100 $m^2/g$ to 300 $m^2/g$.

16. The method of claim 10, wherein a surface of the multi-layered carbon nanotube has reactive functional groups containing an amine group, a carboxyl group, a hydroxyl group or an acyl chloride group.

17. The method of claim 10, wherein an amount of the carbon nanotubes in the plurality of the strip-shaped composite resin layers is 0.5 wt % to 8 wt %.

18. The method of claim 10, wherein the fibers comprise carbon fibers, glass fibers, aromatic polyamine (Kevlar) fibers, boron fibers, nylon fibers, Tedron fibers, cotton fibers, wool fibers, steel fibers, aluminum fibers or ceramic silk fibers.

19. The method of claim 10, wherein the angle is from 0 degree to 40 degrees.

* * * * *